United States Patent [19]

Kirkman

[11] Patent Number: 5,479,960
[45] Date of Patent: Jan. 2, 1996

[54] FLUID COUPLINGS AND SEALS

[76] Inventor: Douglas F. Kirkman, 1 Boniface Rd., Ickenham, Middlesex, England

[21] Appl. No.: 969,164
[22] PCT Filed: Sep. 26, 1991
[86] PCT No.: PCT/GB91/0166
  § 371 Date: Apr. 12, 1993
  § 102(e) Date: Apr. 12, 1993
[87] PCT Pub. No.: WO92/06272
  PCT Pub. Date: Apr. 16, 1992

[30] Foreign Application Priority Data

Sep. 29, 1990 [GB] United Kingdom ............ 9021249

[51] Int. Cl.⁶ ............................................. F16L 37/28
[52] U.S. Cl. ............... 137/614.04; 277/236; 285/917
[58] Field of Search ............... 137/614.04, 614.03; 277/205, 236; 251/149.6; 285/917

[56] References Cited

U.S. PATENT DOCUMENTS

| | | | |
|---|---|---|---|
| 1,117,961 | 11/1914 | Phillips, Jr. | 277/205 X |
| 2,457,052 | 12/1948 | Le Clair | 251/149.6 X |
| 2,538,683 | 1/1951 | Guiler et al. | |
| 2,926,934 | 3/1960 | Gill | 137/614.04 |
| 3,110,502 | 11/1963 | Pagano | 277/205 X |
| 3,581,499 | 6/1971 | Barosko | 277/205 X |
| 3,630,533 | 12/1971 | Butler | 277/205 X |
| 3,918,485 | 11/1975 | Weber et al. | |
| 4,145,057 | 3/1979 | Wheeler | 277/205 X |
| 4,303,249 | 12/1981 | Illy | 277/236 X |
| 4,768,538 | 9/1988 | Mintz et al. | |

FOREIGN PATENT DOCUMENTS

| | | |
|---|---|---|
| 0311296A1 | 9/1988 | European Pat. Off. |
| 2362329 | 8/1977 | France |
| 1248394 | 1/1963 | Germany |
| 807205 | 7/1956 | United Kingdom |
| 2183310 | 4/1986 | United Kingdom |

Primary Examiner—Martin P. Schwadron
Assistant Examiner—Kevin L. Lee
Attorney, Agent, or Firm—Iandiorio & Teska

[57] ABSTRACT

A coupling comprising a female coupler and a male coupler insertable therein, the couplers having mutually engageable poppet valves for allowing fluid flow between the couplers on the mating of the couplers. A J-section annular sealing member has a dynamic sealing portion responsive to internal fluid pressure to seal against the male coupler and a static sealing portion disposed to sealingly engage the female coupler.

9 Claims, 3 Drawing Sheets

FLUID COUPLINGS AND SEALS

This invention relates to couplings for fluid lines and particularly though not exclusively to hydraulic couplings which are employed to couple very high pressure hydraulic lines in subsea control systems and similar circumstances.

BACKGROUND TO THE INVENTION

Couplings for high pressure lines, particularly those intended to use subsea, are customarily self operating, normally comprising a female coupler or receiver and a male coupler or probe insertable in the receiver. The couplers include mutually engageable means, normally spring loaded poppet valves, which engage when the couplers are mated so that high pressure fluid can flow from one coupler to the other couplers. It is necessary to provide at least one seal between the couplers and normally at least two seals therebetween in order to prevent egress of hydraulic working fluid from the coupling. Such seals must be extremely durable and reliable because the couplings are usually required to remain subsea for very long periods of time.

A variety of different forms of seal have been proposed for such couplings. They include crush seals between axially confronting parts of the couplers and, more recently, pressure-responsive resilient metal seals, usually with a C-section. An examples of the latter form of seal is given by U.S. Pat. No. 4,694,889, which describes a coupling in which a C-seal is retained in an annular shoulder in the bore of the female coupler by means of an insert within the body of the coupler. The C-section of the seal faces towards the region of the poppets and its inner periphery engages the outer periphery of the male coupler. A seal of this kind is laterally expanded, both inwardly and outwardly, by internal pressure from the couplers and forms a respectively dynamic radial seal with both the receiver and the probe. A similar seal is provided in the couplings described in U.S. Pat. Nos. 4,768,538 (Mintz et al.) and 4,834,139 (Fitzgibbons).

As remarked above, it is preferable to provide at least one other independent seal between the probe and the receiver. The aforementioned patents disclose the provision of an additional elastomeric O-ring seal retained in an annular internal groove in the female coupler and engaged by the male coupler.

SUMMARY OF THE INVENTION

It is the object of the present invention to provide an improved coupling which enables precise positioning and securing of a sealing member and a reduction in the number of live sealing surfaces. Further objects of the invention are to provide a coupling which facilitates the avoidance of hydraulic lock, provides redundant dual sealing and insensitivity to inrush flows.

In one aspect of the invention, a fluid coupling comprises a female coupler and a male coupler insertable therein, the female coupler and the male coupler having means for allowing transmission of fluid pressure between the couplers on the mating thereof, and a seal having a dynamic sealing portion to sealing against the male coupler and a static sealing portion disposed to sealingly engage the female coupler. In a preferred form of the invention, the seal provides a radial seal for the male coupler and an axial face seal relative to the female coupler.

The aforementioned dynamic sealing portion may be convex towards the male coupler and the static sealing portion may extend radially outwardly from the dynamic sealing portion.

In particular, the seal may comprise a J-section annular sealing member having a curved portion providing a radial seal and a generally flat portion which extends radially outwardly from the curved portion to provide a static seal, preferably against a shoulder of the female coupler.

The dynamic sealing portion may be responsive to fluid pressure within the coupling. Additionally or alternatively the seal may include a spring or springs such as a resilient metal tube for urging the dynamic sealing portion against the male coupler.

The female coupler may include a retainer having a part for urging the static sealing portion against a shoulder within the female coupler. There may be an external sleeve for the positioning of the retainer, which may be integral with the sleeve. Alternatively the retainer may be separate from the sleeve and serve to entrap a second, preferably U-section, elastomeric seal positioned within a recess in the female coupler and adapted to provide a radial seal, which may be fluid pressure-responsive, between the couplers.

DESCRIPTION OF THE DRAWINGS

The present invention will now be described by way of example with reference to the accompanying drawings, in which.

DETAILED DESCRIPTION

For convenience the invention will be described in detail with reference to an embodiment generally similar to that described in the U.S. Pat. No. 4,768,538 (Mintz et al.). However it is not intended to limit the invention to such a particular configuration of coupling and the present invention may be embodied in different ways, for example as modifications of the couplings described in U.S. Pat. No. 4,709,726.

Figure 1:
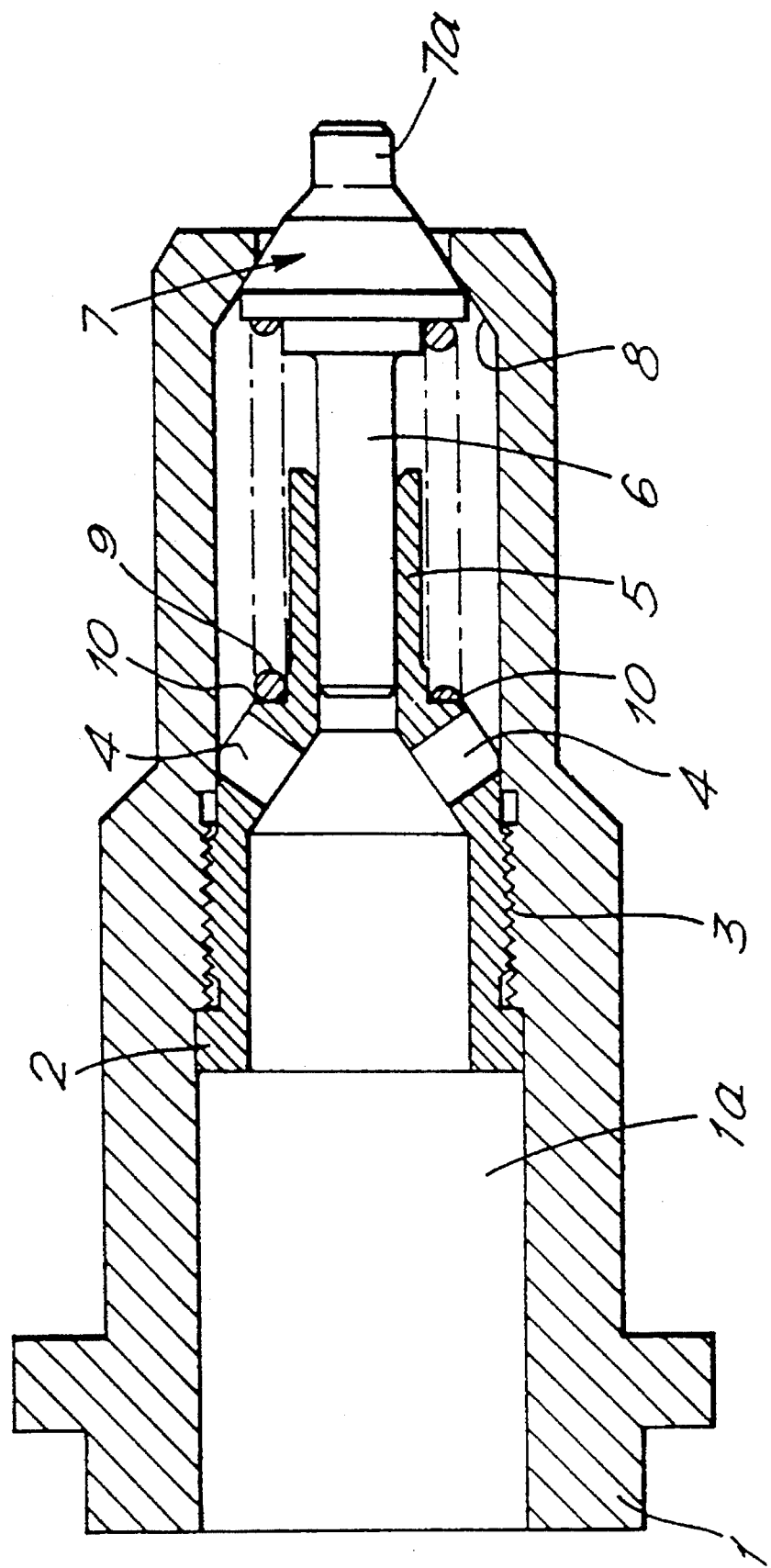
FIG. 1 is a sectional view of a male coupler.
Figure 2:
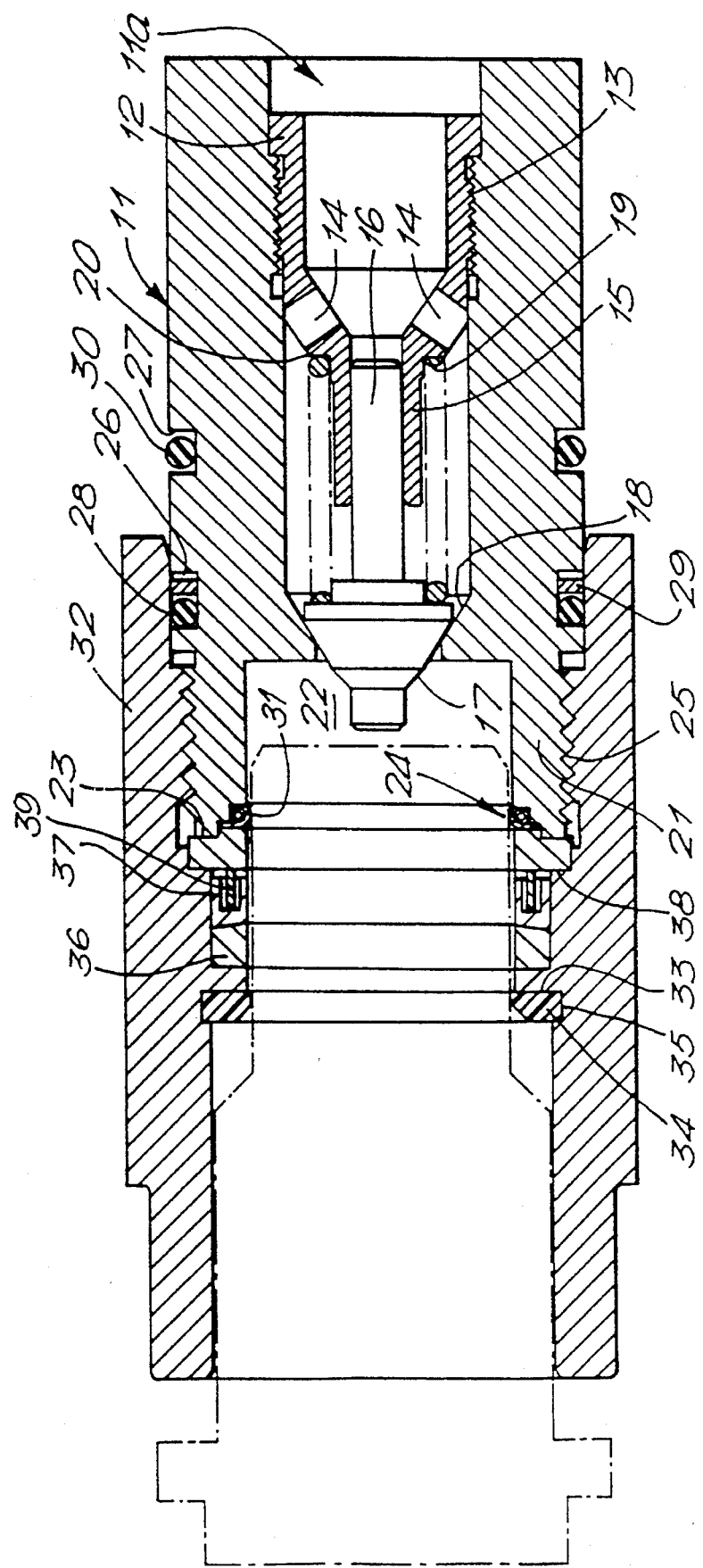
FIG. 2 is a sectional view of a female coupler, the outline of a male coupler being shown in ghost.

The male coupler shown in FIG. 1 and the female coupler shown in FIG. 2 may be axially aligned in a conventional manner for mated engagement to form a coupling. In a typical application, a plurality of couplings each comprising male and female couplers, and each interconnected with respective fluid lines, are provided in female and male umbilical junction plates of a monitoring and/or control system of a hydrocarbon recovery system. In another application, the male couplers can each be mounted in a subsea control module mounting base, while the female couplers are each similarly mounted in the interface flange of a control module. When mated, the couplers interconnect respective fluid lines without loss of the fluid or of the fluid pressure which is being transmitted through the lines, while each coupling also seals the exterior subsea environment from the transmitted fluids. Mating and unmating of the couplings results in little, if any, loss of transmitted fluid to the environment, and the subsea mounting bases may be coupled and uncoupled numerous times during the lift of the subsea operation.

Referring first to FIG. 1, the male coupler has a cylindrical body 1 with an internal bore 1a in which there is a cylindrical insert 2 having a screw fitting 3 to the inside of the bore. The insert 2 has apertures 4 for allowing fluid flow and a forward extension 5 which receives the stem 6 of a poppet valve 7. This valve is urged against a conical seal 8 at the forward end of the male coupler by means of a compression spring 9 between the head of the valve and a shoulder 10 on the insert 2. Fluid flow into or out of the forward end of the male coupler is permitted when the tip 7a of the popper valve 7 is depressed by its engagement with the tip of a similar valve in the female receiver.

The female receiver as shown in FIG. 2 has a body 11 which has an internal bore 11a in which there is an insert 12 similar to the insert 2 for the male coupler. This insert has a screw fitting 13 to the inside of the bore 11a, apertures 14 and a forward extension 15 similar to apertures 4 and extension 5, and the extension receives a stem 16 of a poppet valve 17 urged against a conical seal 18 by means of spring 19 between the head of the valve and the shoulder 20 of the insert 12, all as described relative to the male coupler. When the coupling is fully mated, the internal bore 1a of the male coupler is axially aligned with the internal bore 11a of the female coupler.

The female coupler has at its forward end a cylindrical part 21 which defines a receiving socket 22 for the male coupler. At the end of the female, in the end face 23 of the part 21, is an annular recess 24 which supports an annular seal 31. As is described in more detail later, this seal provides a static seal against the female coupler and a dynamic seal against the male coupler.

On the outside of the cylinder part 21 is a screw threading 25, which co-operates with a retainer constituted by a sleeve 32.

The outer surface of the body 11 of the female coupler includes two circumferential grooves 26 and 27. In the groove 26 are an elastomeric O-ring 28 and a packing ring 29. In the groove 27 is an elastomeric O-ring 30, intended for improving the seal between the female coupler and its fluid line (not shown).

The sleeve 32 has a screw threading engaging the threading 25, the sleeve being fitted such that it is coaxial with the female receiver. The elastomeric O-ring 28 engages the inner periphery of the sleeve near one end thereof to provide a seal between the female coupler and the sleeve and to prevent leakage from the interior of the coupling through the screw threads 25 into the outside environment.

On the inside of the sleeve 32 is an internal flange 33 which supports an annular bushing 34 which is of a resilient polymeric material such as PTFE and has a slightly smaller inside diameter than the flange 34. The bushing seats in an annular groove 35 adjacent the flange 34. The purpose of the alignment bushing is to guide the male coupler during insertion and withdrawal.

Forward of the flange 34 is a packing ring 36. Adjacent this ring is a seal 37. This seal engages the periphery of the male coupler and provides a secondary, or back-up seal in the event that the primary seal 31 should fail.

Although it would be possible to employ an O-ring as the seal 37, as described for example in U.S. Pat. No. 5,343,891 filed 13th Oct. 1990 and in an International Patent Application claiming priority therefrom and filed contemporaneously herewith, the preferred embodiment of the present invention uses an elastomeric U-section seal 37 which provides a radial seal and preferably is positioned so that the outer and inner flanks seal against the respective couplers in response to fluid pressure within the coupling. The seal 37 is maintained in position by a retainer comprising a ring 38 which is held between a shoulder of the sleeve 32 and the end face 23 of the female coupler. The retainer is in this embodiment of the invention separate from the sleeve, and serves to entrap the seal 37. In particular, the retainer 38 holds in position loosely against the inside of the U-seal a thin metallic annulus 39. As described in International Patent U.S. Pat. No. 5,368,070, filed 28th Mar. 1991, this arrangement provides for ease of insertion of the U-section seal and prevents the dislocation of the seal.

The annular retainer 38 extends inwardly over the axial end face 23 of the cylindrical part 21 and extends over an outer part of the seal 31 to help retain this seal in place. The sleeve is screwed on to the female coupler so as to press part of the seal 31 firmly against the end face 23 of the body 11.

Figure 3:
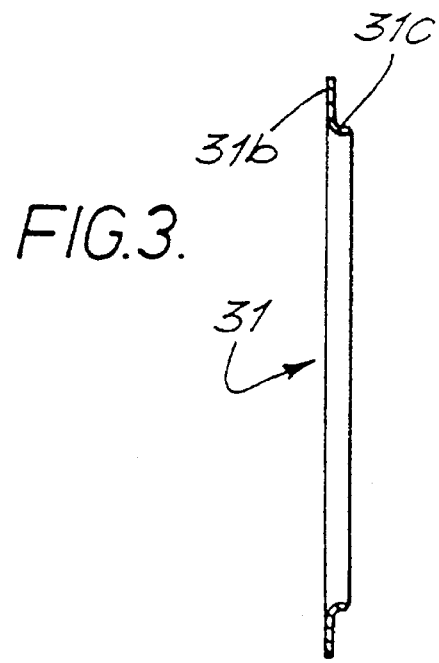
FIGS. 3 to 5 are various views of a seal for use in a coupler as shown in FIG. 2.
Figure 4:
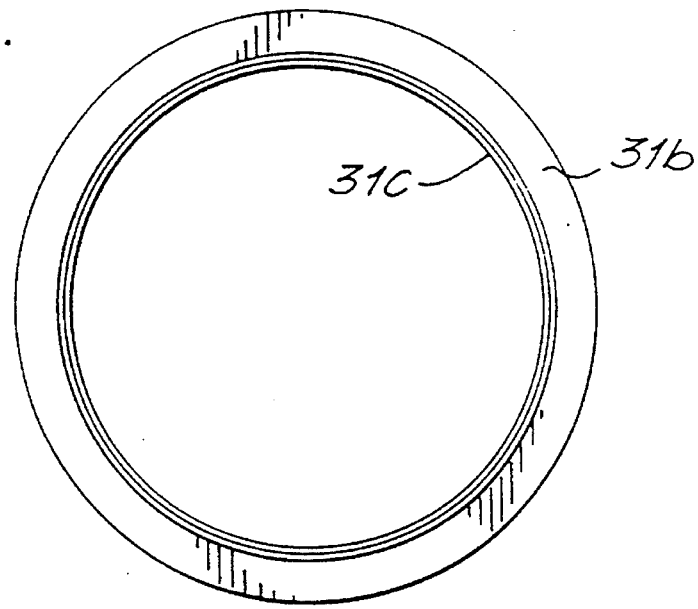
Figure 5:
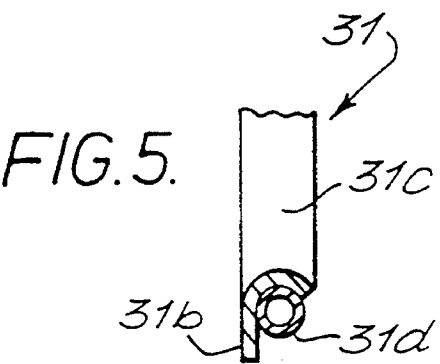

FIGS. 3 to 5 illustrate the seal 31 in greater detail. The seal 31 comprises an annular sealing member 31a, which is preferably metallic and which preferably has a J section, constituted by an outer, flat ring 31b and an inner curved lip 31c. FIG. 3 is a sectional view and FIG. 4 is an end view of the sealing member. As described with reference to FIG. 2, the outer ring part is clamped by the retainer or sleeve 32 against the body 11 of the female coupler to form a static seal therewith. The inner lip is urged against the periphery of the male coupler when the coupler is inserted to form a dynamic seal around the male coupler.

The sealing member could be constituted merely as shown in FIG. 3 and 4, the lip being responsive to fluid pressure within the coupling to engage the male coupler in a manner similar to the action of a C-seal as previously mentioned. Preferably however and as shown in FIG. 5 the seal includes a spring or other resilient means which provides a pressure to urge the lip against the male coupler. In this embodiment of the invention, the lip partly encloses a resilient annular metal tube 31d which extends around the seal, being disposed under the lip. As is shown in FIG. 2, the tube 31d and the lip are located in the annular recess 24 formed at the inner margin of the end face 23 of the cylindrical part 21 of the body 11. This recess is shallower than the combination of the tube and lip, so that the tube 31d engages the longitudinal wall of the recess and the lip protrudes inwardly insufficiently and to be urged by the tube against the male coupler.

Thus the inner portion 31c of the sealing member 31A provides a dynamic resilient radial seal relative to the male coupler. The outer portion 31b provides a static seal, in this embodiment a face seal, relative to the receiver or female coupler.

Figure 6:
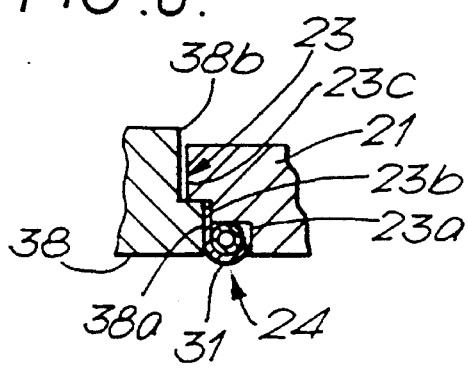
FIG. 6 is a detail of the coupler shown in FIG. 2.

FIG. 6 illustrates the cylindrical part 21, the retainer 38 and the seal in greater detail. The end face 23 of the cylindrical part 21 is stepped to provide an inner shoulder 23a, defining the recess 24 in which the tube 31d is located, an intermediate shoulder 23b, against which the outer rim of the seal 31 is pressed by the inner margin 23c which is confronted by the outer margin 38b of the retainer 38. The retainer is stepped in conformity with the step between the intermediate shoulder 23b and the outer margin 23c of the cylindrical part 21, so that the retainer is radially located within the part 21.

Various modifications are possible in the embodiment described above. For example, the flange 38 may in an embodiment employing a secondary O-ring instead of the U-section seal 37, be constituted as a ring integral with the rest of the sleeve. In a further variation, the end face 23 and the retainer 38 may have confronting annular grooves which provide two pairs of confronting lands between which the outer part 31b of the seal is clamped. Alternatively the flange may have on its face an annular ridge for engagement with the outer part 31b of the seal.

Other variations are possible, and the seal 31, with or without the spring tube 31d, may have utility in sealing arrangements or couplers other than the self-sealing coupler described above.

I claim:

1. A coupling comprising a female coupler and a male coupler insertable therein, said female coupler having at one end a receiving socket for said male coupler, a first internal bore extending to said receiving socket, a valve seal in said first internal bore and a spring loaded poppet valve in said first internal bore and extending into said receiving socket, and said male coupler having a second internal bore including a valve seal at a forward end of said male coupler and a spring loaded poppet valve disposed in said second internal bore, said poppet valves being mutually engageable to allow fluid flow between the couplers on the mating of the couplers and each providing closure of said female coupler and said male coupler respectively when said couplers are mutually withdrawn from mating, and an annular, J-section, metallic sealing member, having a dynamic sealing portion which is convex towards said male coupler and is disposed to seal against the male coupler, and a static sealing portion disposed to sealingly engage the female coupler, said static sealing portion extending radially outwardly from the dynamic sealing portion; and said female coupler further including an annular shoulder at said one end and engaged by the static sealing portion, an annular sleeve, a retainer which is disposed between said annular sleeve and said static sealing portion for urging said static sealing portion against said annular shoulder at said one end and an annular recess accommodating a U-section sealing member providing a radial seal between said female coupler and said male coupler.

2. A coupling according to claim 1 and further comprising an external sleeve for external engagement with the female coupler and for positioning said retainer.

3. A coupling comprising a female coupler and a male coupler insertable therein, the couplers each having a respective poppet valve in said respective internal bore and spring loaded against said respective valve seat, each of said respective poppet valves having a tip and operable to allow fluid flow between the couplers when the tips of the poppet valves mutually engage, and annular sealing means providing seals around the male coupler and against the female coupler, said annular sealing means providing a radial seal for the male coupler and an axial face seal for the female coupler, said sealing means comprising a J-section metallic sealing member having a curved lip which is convex towards said male coupler so as to provide said radial seal, and a generally flat portion which extends radially from the curved lip, said female coupler having an annular internal shoulder against which said generally flat portion abuts and a retainer for urging said flat portion against said annular internal shoulder, and said female coupler further including an annular recess accommodating an additional sealing member providing a radial seal between said female coupler and said male coupler.

4. A coupling according to claim 3 in which the sealing means comprises a J section sealing member having a curved lip providing said radial seal and a generally flat portion which extends radially from the curved lip and abuts a shoulder of the female coupler and the female coupler includes a retainer for urging the flat portion against the shoulder.

5. A coupling according to claim 4 in which the seal includes means for urging the lip against the male coupler.

6. A coupling according to claim 5 in which said means for urging comprises a spring which extends around the sealing member and is disposed under the lip.

7. A coupling comprising a female coupler and a male coupler insertable therein, the couplers having mutually engageable valve means for allowing fluid flow between the couplers on the mating of the couplers, and a sealing member having a dynamic sealing portion disposed to seal against the male coupler and a static sealing portion disposed to sealingly engage the female coupler, and wherein:

said dynamic sealing portion is convex towards the male coupler and the static sealing portion extends radially outwardly from the dynamic sealing portion;

the female coupler includes an annular shoulder which is engaged by the static sealing portion;

the female coupler includes a retainer having a part which clamps the static sealing portion against said shoulder;

said coupling further comprises an external sleeve for external engagement with the female coupler and for positioning said retainer; and the retainer is separate from the sleeve and the coupling further comprises a U-section elastomeric seal which is positioned to provide a radial seal between the couplers and is entrapped by the retainer.

8. A coupling comprising a female coupler and a male coupler insertable therein, the couplers having mutually engageable valve means for allowing fluid flow between the couplers on the mating of the couplers, and a first annular, metallic, J-section sealing member having a dynamic sealing portion disposed to seal against the male coupler and a static sealing portion disposed to sealingly engage the female coupler, and wherein:

said dynamic sealing portion is convex toward the male coupler and the static sealing portion extends radially outwardly from the dynamic sealing portion;

the female coupler includes an annular shoulder which is engaged by the static sealing portion;

the female coupler includes a retainer having a part which clamps the static sealing portion against said shoulder; and the coupling further comprises a second sealing member which is disposed within an annular recess in said female coupler and positioned to provide a radial seal between said couplers.

9. A coupling as set forth in claim 8 wherein said second sealing member comprises a U-section elastomeric seal.

* * * * *